United States Patent [19]
Bar-Cohen et al.

[11] Patent Number: 5,890,553
[45] Date of Patent: Apr. 6, 1999

[54] MULTIFUNCTION AUTOMATED CRAWLING SYSTEM

[75] Inventors: Yoseph Bar-Cohen, Seal Beach; Benjamin Joffe, Chatsworth; Paul Gregory Backes, La Cresenta, all of Calif.

[73] Assignee: California Institute of Technology, Pasadena, Calif.

[21] Appl. No.: 691,202

[22] Filed: Aug. 1, 1996

[51] Int. Cl.[6] .................................................. B62D 57/02
[52] U.S. Cl. ............................... 180/81; 180/901; 180/87
[58] Field of Search .............................. 180/8.1, 8.2, 8.3, 180/8.4, 8.5, 8.6, 8.7, 187, 203, 164, 901; 901/1; 280/1.181, 1.184, 218, 219; 305/1

[56] References Cited

U.S. PATENT DOCUMENTS

| | | | |
|---|---|---|---|
| 2,230,759 | 2/1941 | Page | 180/8.1 |
| 2,660,253 | 11/1953 | Davidson | 180/8.5 |
| 3,913,452 | 10/1975 | Ward et al. | 180/8.1 |
| 4,674,949 | 6/1987 | Kroczynski | 180/8.6 |
| 4,790,400 | 12/1988 | Sheeter | 180/8.3 |
| 4,938,305 | 7/1990 | Park | 180/8.1 |
| 5,040,626 | 8/1991 | Paynter | 180/8.6 |
| 5,351,626 | 10/1994 | Yanagisawa | 180/8.6 |
| 5,351,773 | 10/1994 | Yanagisawa | 180/8.1 |
| 5,429,009 | 7/1995 | Wolfe et al. | 180/8.5 |
| 5,551,525 | 9/1996 | Pack et al. | 180/8.6 |

FOREIGN PATENT DOCUMENTS

| | | | |
|---|---|---|---|
| 61-67679 | 4/1986 | Japan | 180/8.1 |
| 397612 | 9/1973 | U.S.S.R. | 180/8.1 |

OTHER PUBLICATIONS

Mechanical Engineering Department, Wichita State University, "Design and Analysis of a Wall Climbing Robot" *B. Bahr, Y. Li, and M. Najafi.*

The National Institute for Aviation Research, Witchita State University, "Wall–Climbing Robot in an Unstructured Environment" *Behnam Bahr, Ph.D.*

Mechanical Engineering Department, Wichita State University, "Wall Climbing Robots for Aircraft, Ships, Nuclear Power Plants, Sky Scrapers, etc." *Behnam Bahr, Yusheng Yin.*

JSME International Journal, Dynamic Behavior of Crawler–Type Vehicles* (The Experimental Examination of Straight Propelling) *Hiroyuki Sogo, Mitsuhiko Hasegawa, Masajiro Abe, Hiroshi Ito and Shingo Kage.*

Robotics Institute, Carnegie Mellon Universith Pittsburgh PA, "Mobile Robots for Difficult Measurements in Difficult Environments: Application to Aging Aqircraft Inspection" *M. W. Siegel.*

Final Version, 94–Mar.–17, Automation Tools for Nondestructive Inspection Aircraft: Promise of Technology Transfer from the Civilian to the Military Sector *Chris Seher, Mel Siegel, and William M. Kaufman* pp. 1–9.

(List continued on next page.)

*Primary Examiner*—J. J. Swann
*Assistant Examiner*—Gary Savitt
*Attorney, Agent, or Firm*—Michaelson & Wallace

[57] ABSTRACT

The present invention is an automated crawling robot system including a platform, a first leg assembly, a second leg assembly, first and second rails attached to the platform, and an onboard electronic computer controller. The first leg assembly has an intermittent coupling device and the second leg assembly has an intermittent coupling device for intermittently coupling the respective first and second leg assemblies to a particular object. The first and second leg assemblies are slidably coupled to the rail assembly and are slidably driven by motors to thereby allow linear movement. In addition, the first leg assembly is rotary driven by a rotary motor to thereby provide rotary motion relative to the platform. To effectuate motion, the intermittent coupling devices of the first and second leg assemblies alternately couple the respective first and second leg assemblies to an object. This motion is done while simultaneously moving one of the leg assemblies linearly in the desired direction and preparing the next step. This arrangement allows the crawler of the present invention to traverse an object in a range of motion covering 360 degrees.

15 Claims, 8 Drawing Sheets

OTHER PUBLICATIONS

Carnegie Mellon Research Institute, Robotics Institute "The Development of a Robotic System to Assist Aircraft Inspectors" *C. J. Alberts and W. M. Kaufman*.

Carnegie Mellon University, The Robotics Institute, School of Computer Science, "Vision Algorithms for Guiding the Automated Nondestructive Inspector of Aging Aircraft Skins" *Ian Lane Davis and M. W. Siegel*.

JSME International Journal, Series C, vol. 38, No. 2, 1995, "A Study on Wall Surface Mobile Robots*" (Development of Moving Mechanism for Crawler–Type Wall Surface Mobile Robots with Vacuum Pads *Toshio Fukuda, Fumihito Arai, Hideo Matsuura, Kenji Nishibori, Hitoshi Sadauchi and Naohito Yoshii*.

Boeing Advisor, Boeing Customer Services Division Publication, vol. 16, No. 5, May 1995, "Autocrawler a Candidate for NDT Testing".

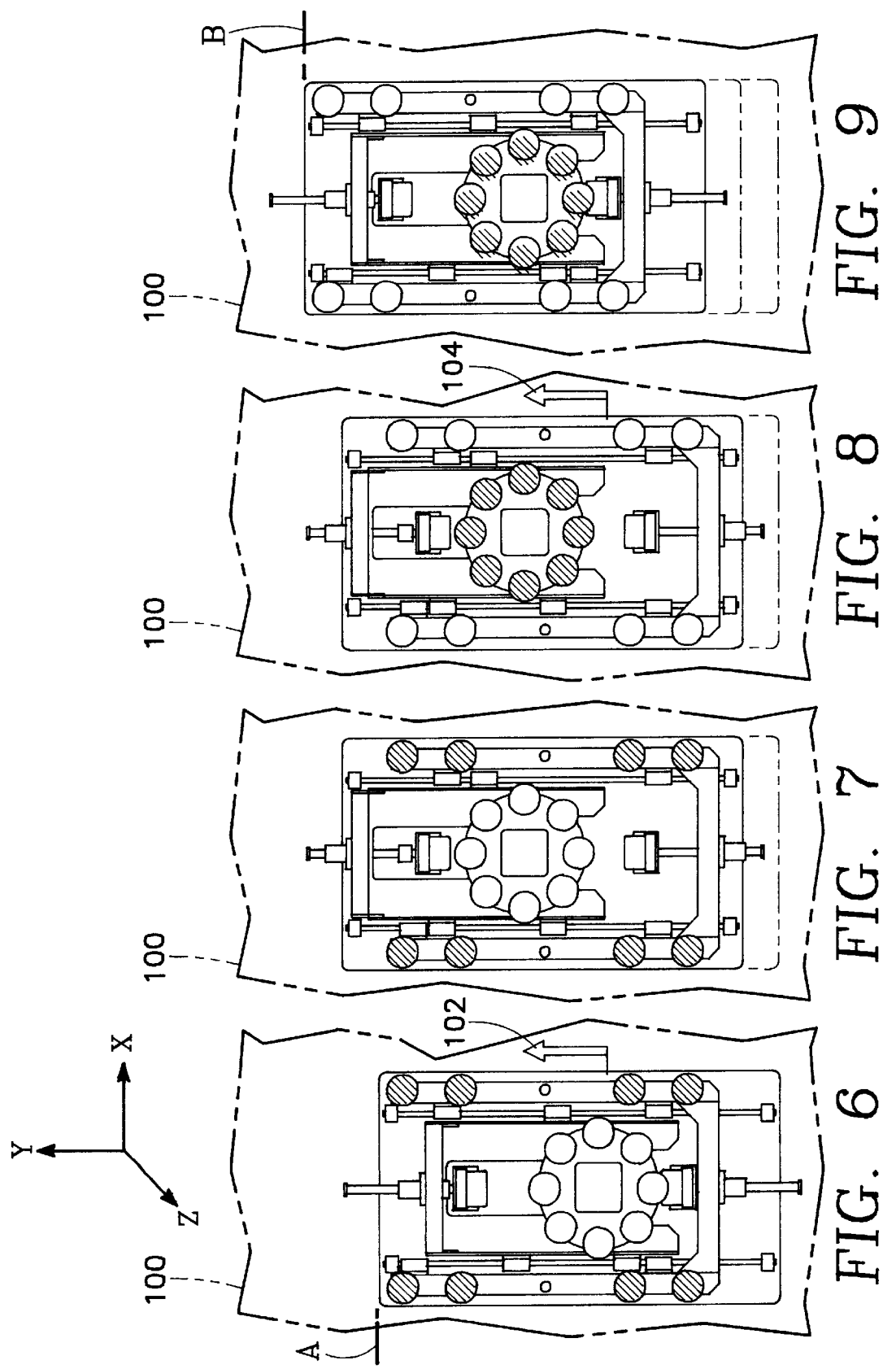

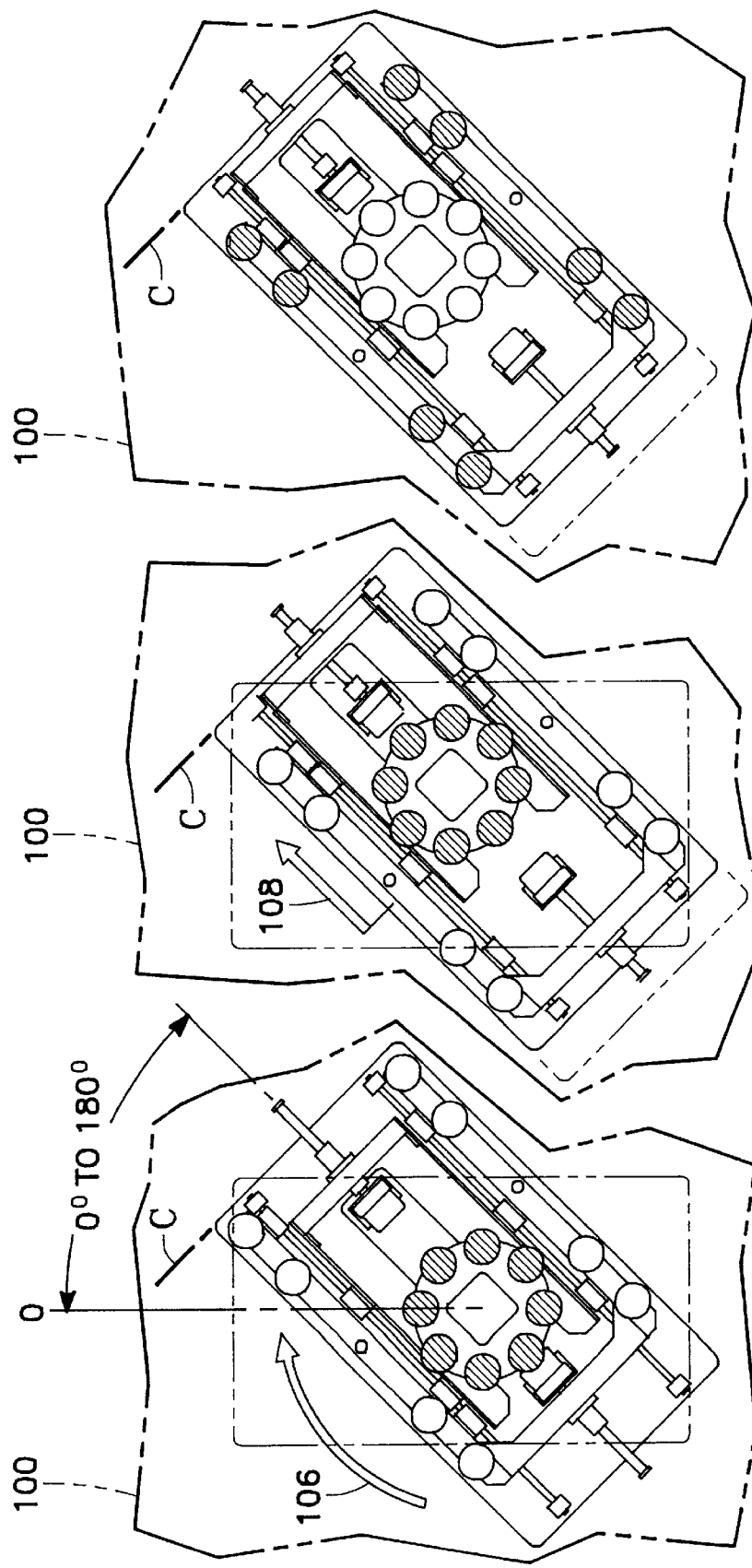

MULTIFUNCTION AUTOMATED CRAWLING SYSTEM

ORIGIN OF THE INVENTION

The invention described herein was made in the performance of work under a NASA contract, and is subject to the provisions of Public Law 96-517 (35 USC 202) in which the contractor has elected to retain title.

BACKGROUND OF THE INVENTION

1. Field of the Invention

The present invention relates to automated robot systems, and in particular to an automated crawling robot with multifunctional purposes, such as performing labor intensive tasks and/or dangerous field tasks.

2. Related Art

Automated robotic crawling systems are needed to perform labor intensive and dangerous field tasks in the areas of structures inspection/repair. Typical tasks for crawling systems include inspection of repairs of aircraft, detection of cracks, dents, corrosion, impact damage, delaminations, fire damage, porosity, and other flaws in structures. Also, crawling systems are needed for the performance of specific tasks, such as hazardous material handling, including toxic materials and bombs.

Current crawling systems include, for instance, a tank crawler and a cruciform crawler. The tank crawler has a body with a continuous belt having a vacuum pad with numerous suckers. Each sucker is connected to an air duct inside the continuous belt and has a mechanical valve. For each sucker, the valve opens mechanically when the sucker touches the surface of a particular object to thereby allow the sucker to cling to the surface. A motor, timing belt, and timing pulley are located within the body and operate to turn the continuous belt to provide the tank crawler with secure movement over a surface of an object.

The cruciform crawler comprises a horizontal spine and vertical bridges. Both the horizontal spine and the bridges have plural suction cups for secure coupling to a particular object. In order to effectuate movement of the cruciform crawler, the vertical bridges are moved forward while the suction cups of the horizontal spine are secured to an object. Next, the spine is moved forward while the suction cups of the vertical bridges are secured to complete one cycle. Each cycle produces linear movement of the cruciform crawler across an object.

Although the tank crawler has proven useful for certain tasks, the tank crawler is cumbersome, is large and bulky, and has limited movement. For example, the tank crawler cannot perform difficult maneuvers and does not provide a full range of motion. Thus, the limited motion of the tank crawler, as well as the cumbersome, bulky, and large size of the tank crawler, prohibits it from performing certain important tasks. In addition, steering the tank causes wear to the suckers which are attached to the belt.

With regard to the cruciform crawler, the movement of the cruciform crawler is limited to mainly linear movement and not sharp angular maneuvers. Consequently, does not allow a full 360 degree range of motion over a point. Thus, the limited motion of the cruciform crawler prohibits it from performing certain important tasks. In addition, similar to the suckers of the tank crawler, the suckers are subject to wear during maneuver.

Many current crawling systems are heavy, are complex to operate and maneuver, have high power requirements involved with preparation time between steps and have low payload/crawler weight ratio. Moreover, since these current crawling systems are designed for specific tasks, they have limited uses and cannot be utilized for a variety of tasks. Further, existing crawling systems do not have carrying areas for carrying observation cameras, sensors and sensor manipulation devices, and data gathering equipment such as computer processors, for transporting hazardous materials, for retrieving items and objects, etc.

Therefore, what is needed is a portable, user friendly automated robotic crawling system that can move rapidly over large areas with a full range of motion, perform a wide variety of tasks in all types of environments, including hostile environments, and access difficult to reach areas. What is further needed is a crawling system that has a carrying area for carrying observation cameras, sensors and sensor manipulation devices, and data gathering equipment such as computer processors, for transporting hazardous materials, and for retrieving items and objects.

Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is an automated crawling robot system with multifunctional purposes.

The automated crawling system includes a platform, a first leg assembly, a second leg assembly, first and second guiding rails attached to the platform, and an onboard electronic computer controller. The onboard computer can control the movement of the robot and can have preprogrammed instructions or can accept remote commands. The first and second leg assemblies have intermittent coupling devices for intermittently coupling the respective first and second leg assemblies to a particular object.

The first leg assembly is slidably coupled to the first rail and is slidably driven by a first motor to thereby effectuate linear movement of the first leg assembly relative to the platform. Similarly, the second leg assembly is slidably coupled to the second rail and is slidably driven by a second motor to thereby effectuate linear movement of the second leg assembly relative to the platform. In addition, the first leg assembly is rotatably coupled to the platform and is rotary driven by a rotary motor to thereby provide rotary motion to the first leg assembly relative to the platform.

The intermittent coupling devices of the first and second leg assemblies alternately couple the respective first and second leg assemblies to an object. Specifically, the crawler of the present invention effectuates movement with repetitive cyclic actions. For each cycle, first the intermittent coupling device of the first leg assembly is initially coupled to a particular object while the intermittent coupling device of the second leg assembly remains uncoupled to the object. Next, the second assembly is linearly traversed by the second motor.

Third, the intermittent coupling device of the second leg assembly is coupled to the object while the intermittent coupling device of the first leg assembly remains uncoupled to the object. While the previous step is being completed, the crawler prepares a subsequent step for movement. This arrangement provides efficient time management for increased speed of travel. Also, it should be noted that the first leg assembly can be linearly traversed by the first motor or rotatably traversed by the rotary motor either separately or simultaneously. This arrangement allows the crawler of the present invention to traverse an object in a range of motion covering 360 degrees.

A feature of the automated crawling system of the present invention is its two leg assembly with both linear and rotary motion to allow traversal in any direction. Another feature of the present invention is the carrying area for carrying observation cameras, sensors and sensor manipulation devices, and data gathering equipment such as computer processors, for transporting hazardous materials, and for retrieving items and objects. Another feature of the present invention is its intermittent coupling devices which allow the automated crawling system to traverse an object rapidly. Yet another feature is simultaneous preparation of a subsequent step while a previous step is being completed.

An advantage of the automated crawling system of the present invention is the ability to perform multifunctional operations. Another advantage of the automated crawling system of the present invention is that it is portable, can obtain rapid movements over large areas, and can perform a wide variety of tasks in all types of environments, including hostile environments and environments with difficult to reach areas. Yet another advantage of the present invention is that it has low power requirements and has a high payload/crawler weight ratio. Yet another advantage is speedy traversal due to efficient time management.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout:

FIGS. 6–12 illustrate sequential movement of the automated crawling system from point A to point B;

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
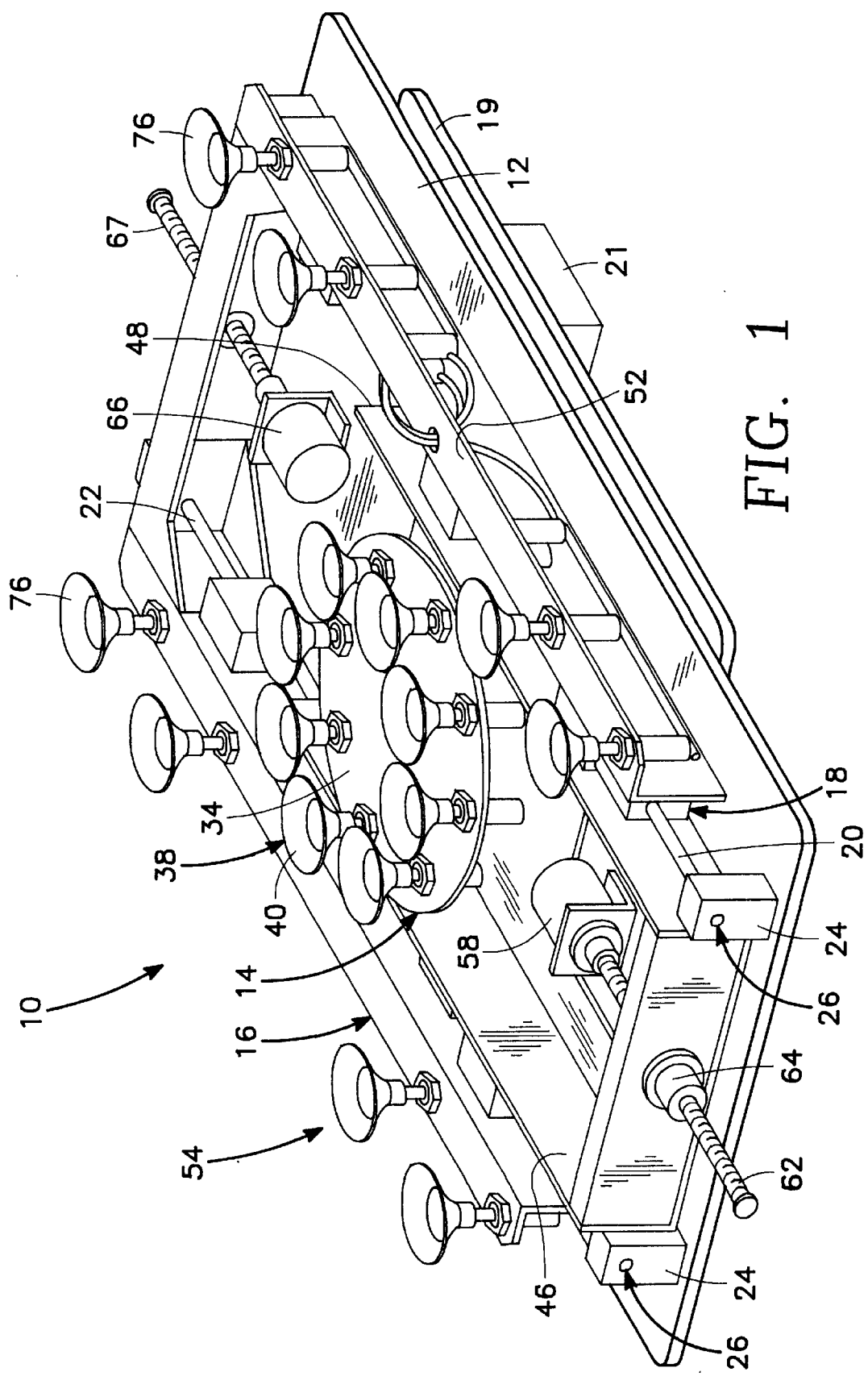
FIG. 1 is a perspective view of the automated crawling system of the present invention.
Figure 2:
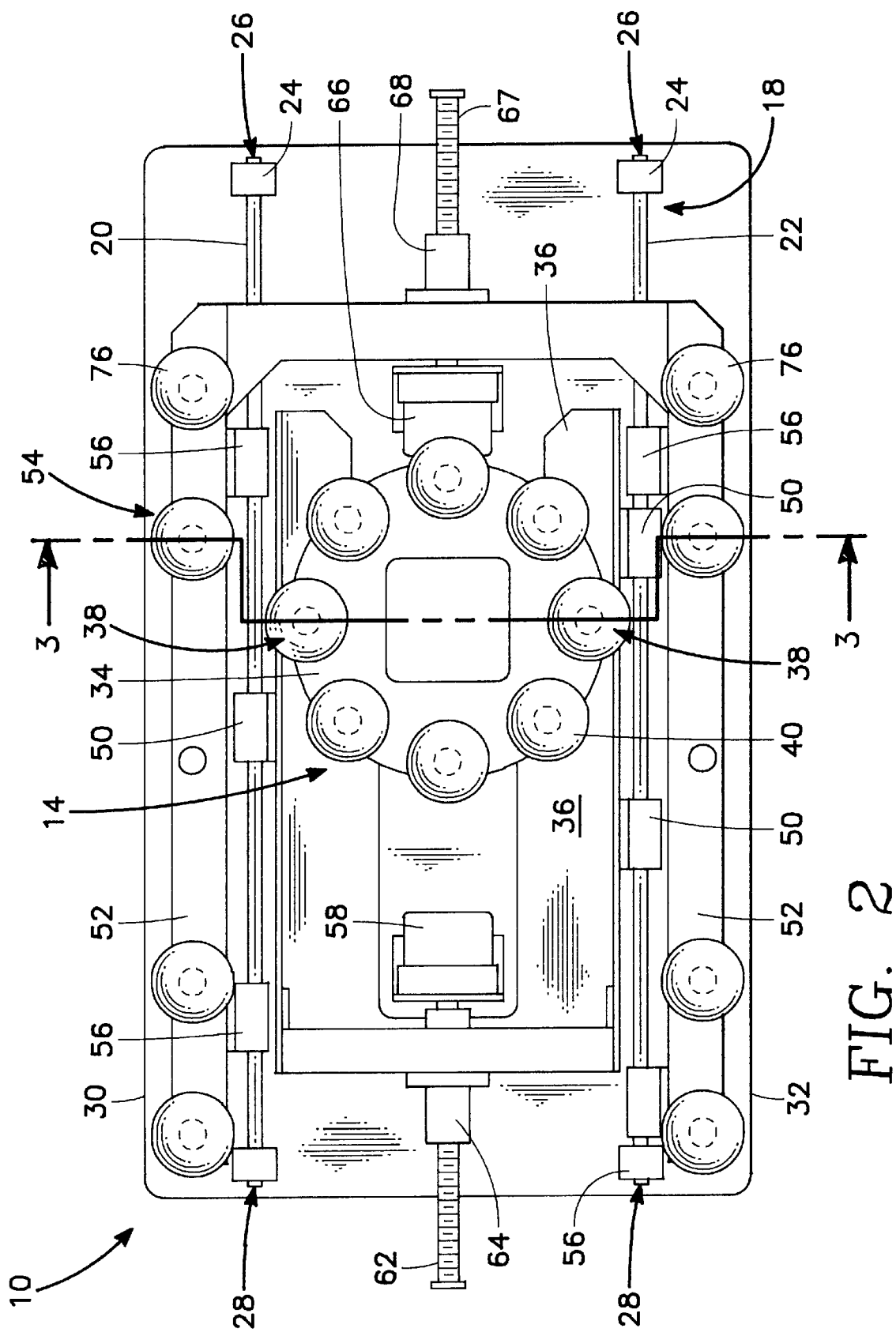
FIG. 2 is a bottom view of the automated crawling system of the present invention.

FIG. 1 is a perspective view of the automated crawling system of the present invention. FIG. 2 is a bottom view of the automated crawling system of the present invention.

Structural Components

The present invention is an automated crawling system 10 including a platform 12, such as a flat platform, a first leg assembly 14, a second leg assembly 16, a rail assembly 18, and an onboard electronic computer controller 21. The carrying area 19 can carry observation cameras, sensors and sensor manipulation devices, and data gathering equipment such as computer processors, and can transport hazardous materials, and can retrieve items and objects. The onboard computer controller 21 can control the movement of the robot with preprogrammed instructions or can accept remote commands.

The rail assembly 18 comprises a first rail 20, a second rail 22, and rail supports 24 located at an end 26, 28 of each rail 20, 22, respectively. The first and second rails 20, 22 are attached or mounted to the platform 12 and extend along opposite longsides 30, 32 of the platform 12 of the crawler 10.

The first leg assembly 14 comprises a mounting disc 34, such as a circular flat disc, a first bracket 36, and an intermittent coupling device 38, such as a plurality of vacuum cups 40. The intermittent coupling device 38 can comprise any mechanism suitable for intermittent coupling to a particular object (described in detail in the Operation section below). For example, an intermittent coupling device with a vacuum cup arrangement 40, as shown in FIG. 1, is suitable for intermittent coupling to a surface of a particular object and will be described hereafter as a working example. However, for ferromagnetic objects or objects with ferromagnetic surfaces, a magnetic device having intermittently activated solenoids can be utilized as the intermittent coupling device.

The mounting disc 34 is attached to the first bracket 36.

The first bracket 36 preferably has two strips 46, 48 extending outwardly from the platform 12. A plurality of sliders 50 are preferably attached to each outside portion of the strips 46, 48 of the first bracket 36. Each slider 50 is also slidably coupled to one of the rails 20, 22 of the rail assembly 18. The sliders 50 provide the first bracket 36 with freedom of linear movement relative to the platform 12.

The second leg assembly 16 comprises a second bracket 52 and an intermittent coupling device 54 similar to the intermittent coupling device 38 of FIG. 1, which is preferably a plurality of vacuum cups 76 (similar to vacuum cups 40 of FIG. 2). The second bracket 52 is preferably a "U" shaped bracket with a topside surface and opposite inside surfaces. The second bracket 52 has a plurality of sliders 56 (similar to sliders 50 of FIG. 2) preferably attached to each inside surface of the second bracket 52. Each slider 56 is also slidably coupled to one of the rails 20, 22 of the rail assembly 18.

A first motor 58, which can be a conventional electric motor, is rigidly attached to the platform 12. The first motor 58 has a ball screw shaft 62 coupled to a first receiver 64 which can be attached to or integral with the first bracket 36. Also, the first motor 58 can have encoders (not shown) to determine the position of traversal of the first bracket 36. Since the first bracket 36 is slidably coupled to the platform 12 and the first receiver 64 is rigidly attached the first bracket 36, the first motor 58 and the ball screw shaft 62 provide the first bracket 36 with linear motion, relative to the platform 12, in either a forward or reverse direction (described in detail in the Operation section below).

Similar to the first motor 58 configuration, a second motor 66 is rigidly attached to the platform 12. The second motor 66 has a ball screw shaft 67 coupled to a second receiver 68 which can be attached to or integral with the second bracket 52. Also, the second motor 66 can have encoders (not shown) to determine the position of traversal of the second bracket 52. Since the second bracket 52 is slidably coupled to the platform 12 and the second receiver 68 is rigidly attached the second bracket 52, the second motor 66 and the ball screw shaft 67 provide the second bracket 52 with linear motion, relative to the platform 12, in either a forward or reverse direction (described in detail in the Operation section below).

Figure 3:
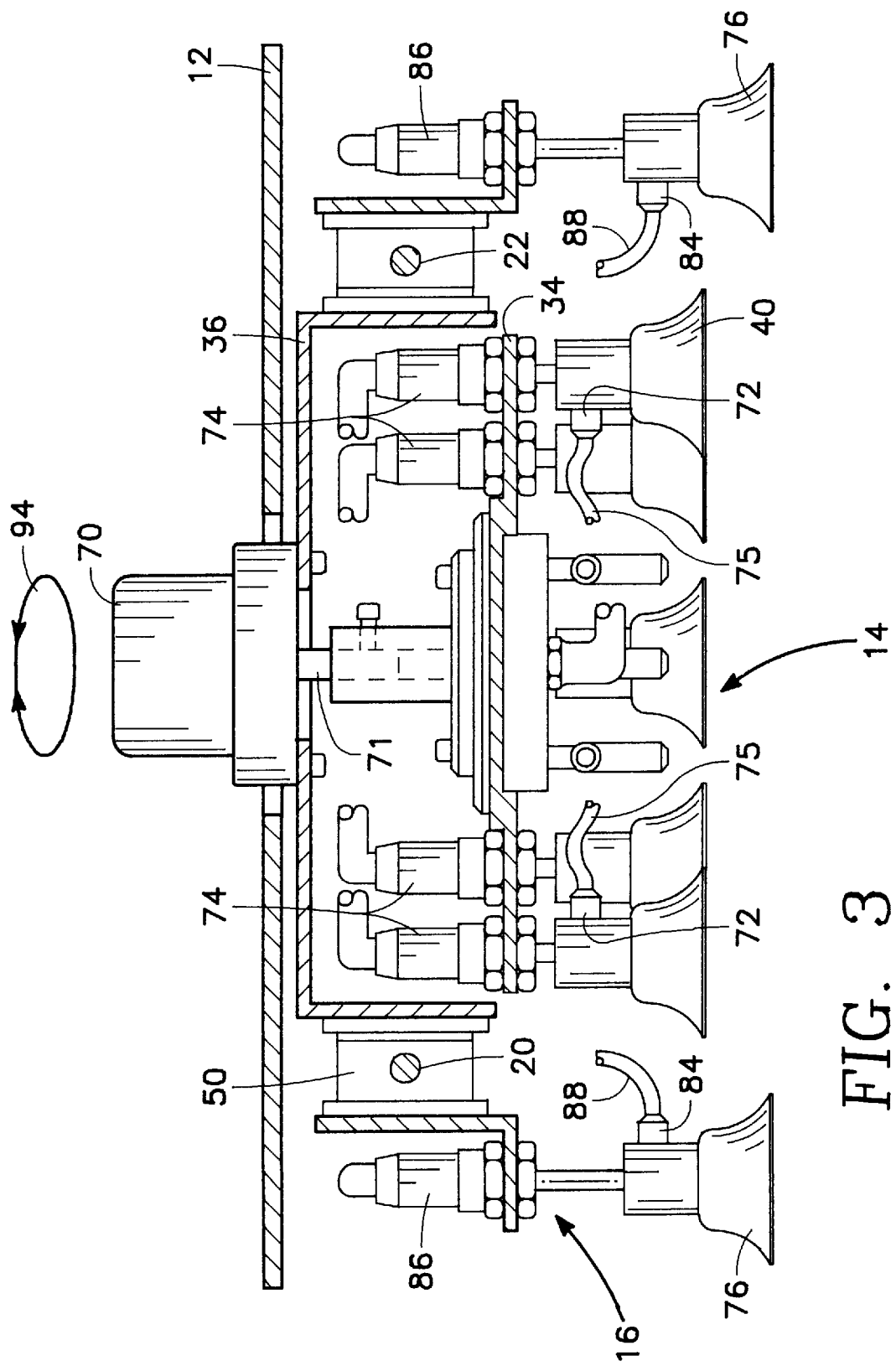
FIG. 3 is a cross sectional side view of the automated crawling system of the present invention.

FIG. 3 is a cross sectional side view of the automated crawling system of the present invention of FIG. 2. A rotary motor 70, which can be an ultrasonic motor, such as a low mass compact ultrasonic motor, or other type of rotary motor, is preferably attached to the first bracket 36 and is coupled to the mounting disc 34 via a shaft 71. The rotary motor 70 provides the mounting disc 34 with rotary motion in either a clockwise or counter clockwise direction.

Referring to FIG. 3 along with FIGS. 1 and 2, the vacuum cups 40 of the first leg assembly 14 are preferably attached to the mounting disc 34 so that they protrude from the mounting disc 34 as shown in FIG. 3. Each vacuum cup 40 has a separate vacuum pump 72 and a separate air cylinder 74 coupled to it and attached to the mounting disc 34. Each vacuum pump 72 provides each vacuum cup with a vacuum source independent of the other vacuum cups, such as a venturi vacuum pump.

The vacuum pumps 72 and the air cylinders 74 are also coupled to a standard air compressor (not shown) for providing each vacuum pump 72 and air cylinder 74 with air pressures preferably ranging from 70–120 psi. Flexible tubing 75, such as polyethylene tubing, PVC tubing, or the like, provides a means for transferring the air pressure from the air compressor to each vacuum pump 72 and each air cylinder 74.

The vacuum cups 76 of the second leg assembly 16 are preferably attached to the second bracket 52 so that they protrude from the topside surface of the second bracket 54. Similar to the vacuum cups 40 of the first leg assembly 14, each vacuum cup 76 of the second leg assembly 16 has a separate vacuum pump 84 coupled to it and attached to the second bracket 52. Also, each vacuum cup 76 of the second leg assembly 16 has a separate air cylinder 86 coupled to it and mounted behind each vacuum cup 76.

In addition, similar to the vacuum pumps 72 of the first leg assembly 14, each vacuum pump 84 of the second assembly 16 is preferably a venturi vacuum pump. Moreover, the air cylinders 86 and the vacuum pumps 84 of the second assembly 16 are coupled to the same air compressor (not shown) as the vacuum pumps 52 and air cylinders 54 of the first leg assembly 14. Flexible tubing 88 similar to flexible tubing 75 is used with the second leg assembly 16. As stated above, it should be noted that the intermittent coupling devices 38, 54 can be any device suitable for coupling to an object is not limited to being a vacuum pump device.

Figure 4:
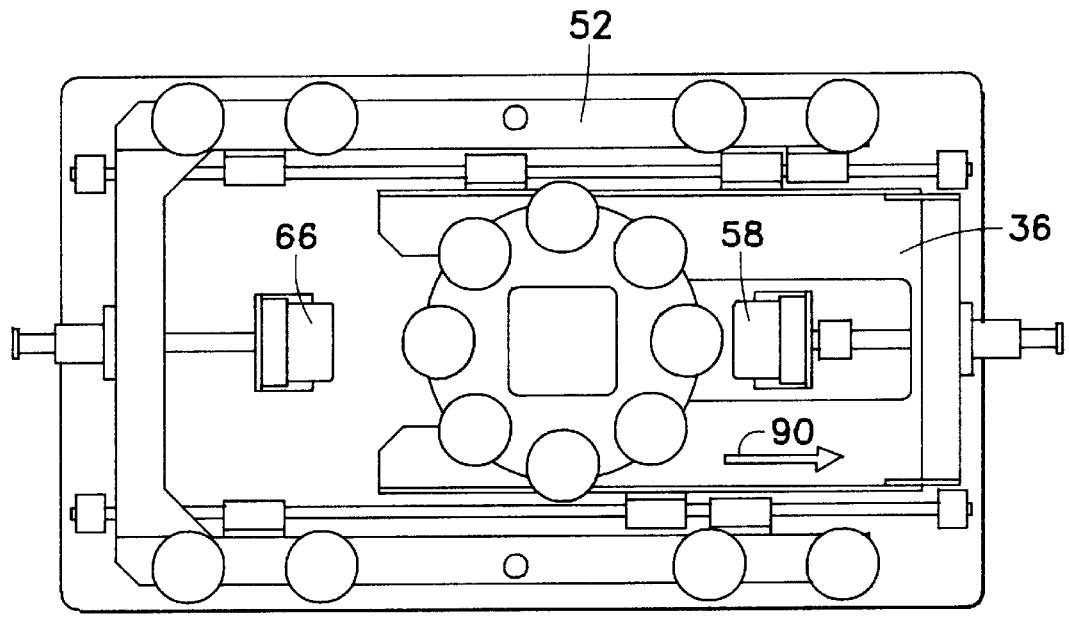
FIG. 4 is a bottom view of the first leg of the automated crawling system at its front-most extreme position and the second leg at its rear-most extreme position.
Figure 5:
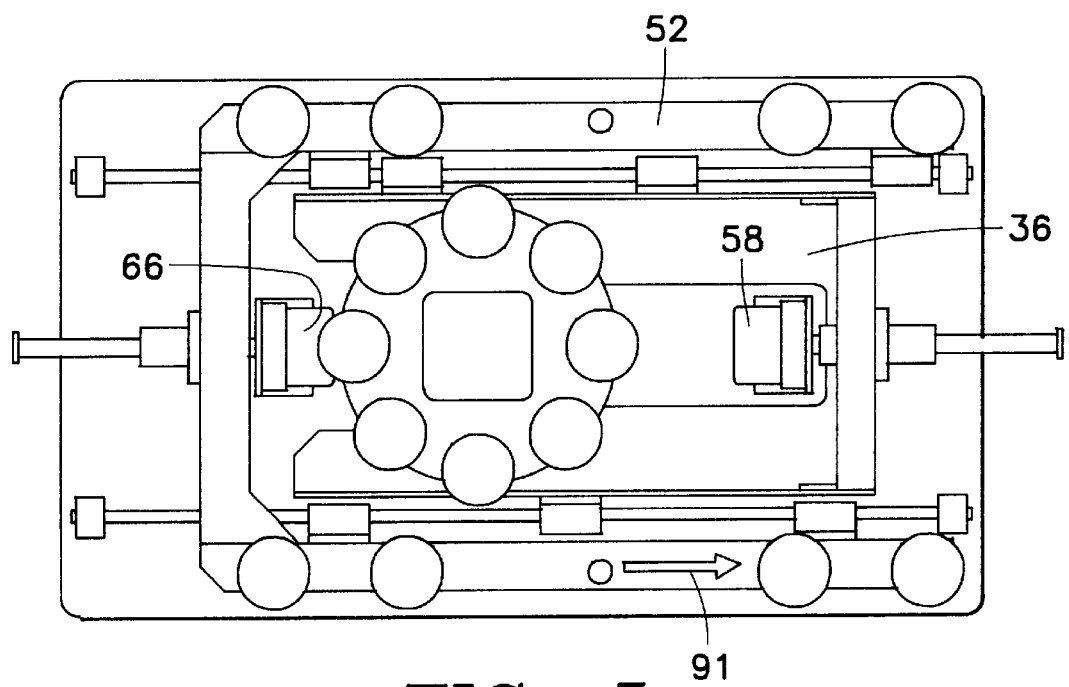
FIG. 5 is a bottom view of the first leg of the automated crawling system at its rear-most extreme position and the second leg at its front-most extreme position.

FIG. 4 is a bottom view of the first leg assembly and the second leg assembly of the automated crawling system of the present invention at their front-most extreme positions, respectively. FIG. 5 is a bottom view of the first leg assembly and the second leg assembly of the automated crawling system of the present invention at their rear-most extreme positions, respectively.

The first motor 58 allows movement of the first leg assembly 14 linearly along the rails 20, 22, relative to the platform 12, in the direction indicated by arrow 90. Similarly, the second motor 66 allows movement of the second leg assembly 16 linearly along the rails 20, 22, relative to the platform 12, in the direction indicated by arrow. In addition, the rotary motor 70 allows movement of the first leg assembly 14 rotationally along the shaft 71, in the direction indicated by arrow 94 as shown in FIG. 3. A detailed description of the operation and the interaction of the components of the crawler 10 will be discussed in the Operation section below.

Operation

FIGS. 6–12 illustrate sequential movement of the automated crawling system from point A to point B to point C along x and y axes and around a z axis. The onboard computer controller 21 can control the movement of the robot with preprogrammed instructions or can accept remote commands. The crawler of the present invention effectuates movement with repetitive cyclic actions.

FIGS. 6–9 illustrate one cycle of linear movement and FIGS. 10–12 illustrate rotational movement. For each cycle, first referring to FIG. 6, the intermittent coupling device 54 of the second leg assembly 16 is initially coupled (as indicated by shading of the intermittent coupling device 54 of FIG. 6) to a particular object 100. During this, the intermittent coupling device 38 of the first leg assembly 14 remains uncoupled (as indicated by non-shading of the intermittent coupling device 38 of FIG. 6) to the object 100.

Next, as shown in FIG. 7, the second leg assembly 16 is linearly traversed by the second motor 66. Linear movement of the platform 12 relative to the object 100, as indicated by arrow 102, is accomplished by operating the second motor 66. As the second motor 66 operates, the ball screw shaft 67 traverses along the second receiver 68. After traversal, the second leg assembly 16 is uncoupled from the object 100.

Third, as shown in FIG. 8, the intermittent coupling device 38 of the first leg assembly 14 is coupled (as indicated by shading of the intermittent coupling device 38 of FIG. 7) to the object 100 while the intermittent coupling device 54 of the second leg assembly 16 remains uncoupled (as indicated by non-shading of the intermittent coupling device 54 of FIG. 7) to the object 100. It should be noted that while the previous step is being completed, the crawler 10 prepares a subsequent step for movement by operating the first motor 58. This arrangement provides efficient time management for increased speed of travel. Both leg assemblies 14, 16, move relative to the platform 12 during linear motion because both motors are moving during linear motion. One of the leg assemblies 14 or 16, move relative to the object 100.

Fourth, as shown in FIG. 9 and similar to the movement of the second leg assembly 16, linear movement of the platform 12 relative to the object 100, as indicated by arrow 104, is accomplished by operating the first motor 58. As the first motor 58 operates, the ball screw shaft 62 traverses along the first receiver 64. Since the first receiver 64 is rigidly attached to the second bracket 52, the first motor 58 is rigidly attached to the platform 12, and the platform 12 is slidably attached to the second bracket 52 via the rails 20, 22, linear movement (forward or reverse) of the second bracket 52 along the rails 20, 22 relative to the platform 12 is accomplished.

Further, as shown in FIG. 10, the crawler of the present invention can rotationally change direction of movement with a 360 degree range of motion. For example, first the intermittent coupling device 38 of the first leg assembly 14 is coupled (indicated by shading of the intermittent coupling device 38 of FIG. 10) to the object 100. Next, the intermittent coupling device 54 of the second leg assembly 16 is uncoupled (indicated by non-shading of the intermittent coupling device 54 of FIG. 7) to the object 100.

The rotary motor 70 is then operated for providing the mounting disc 34 with rotary motion in either a clockwise, as indicated by arrow 106 to reach point C, or counter clockwise direction. Since the rotary motor 70 provides relative rotational motion between the mounting disc 34 and the first bracket 36, and the first bracket 36 is attached to the platform 12, the platform 12 rotates during operation of the rotary motor 70, with a range of motion of 360 degrees.

After the desired rotation of the crawler is achieved, the crawler can be linearly traversed by repeating cycles of movement as discussed above. As shown in FIG. 11, the intermittent coupling device 54 of the second leg assembly 16 is again coupled (as indicated by shading of the intermittent coupling device 54 of FIG. 11) to the object 100. During this, the intermittent coupling device 38 of the first leg assembly 14 is uncoupled (as indicated by non-shading of the intermittent coupling device 38 of FIG. 11) to the object 100. Next, as shown in FIG. 12, the second leg assembly 16 is linearly traversed, as indicated by arrow 108, by the second motor 66 in accordance with the above discussion.

Figure 13:
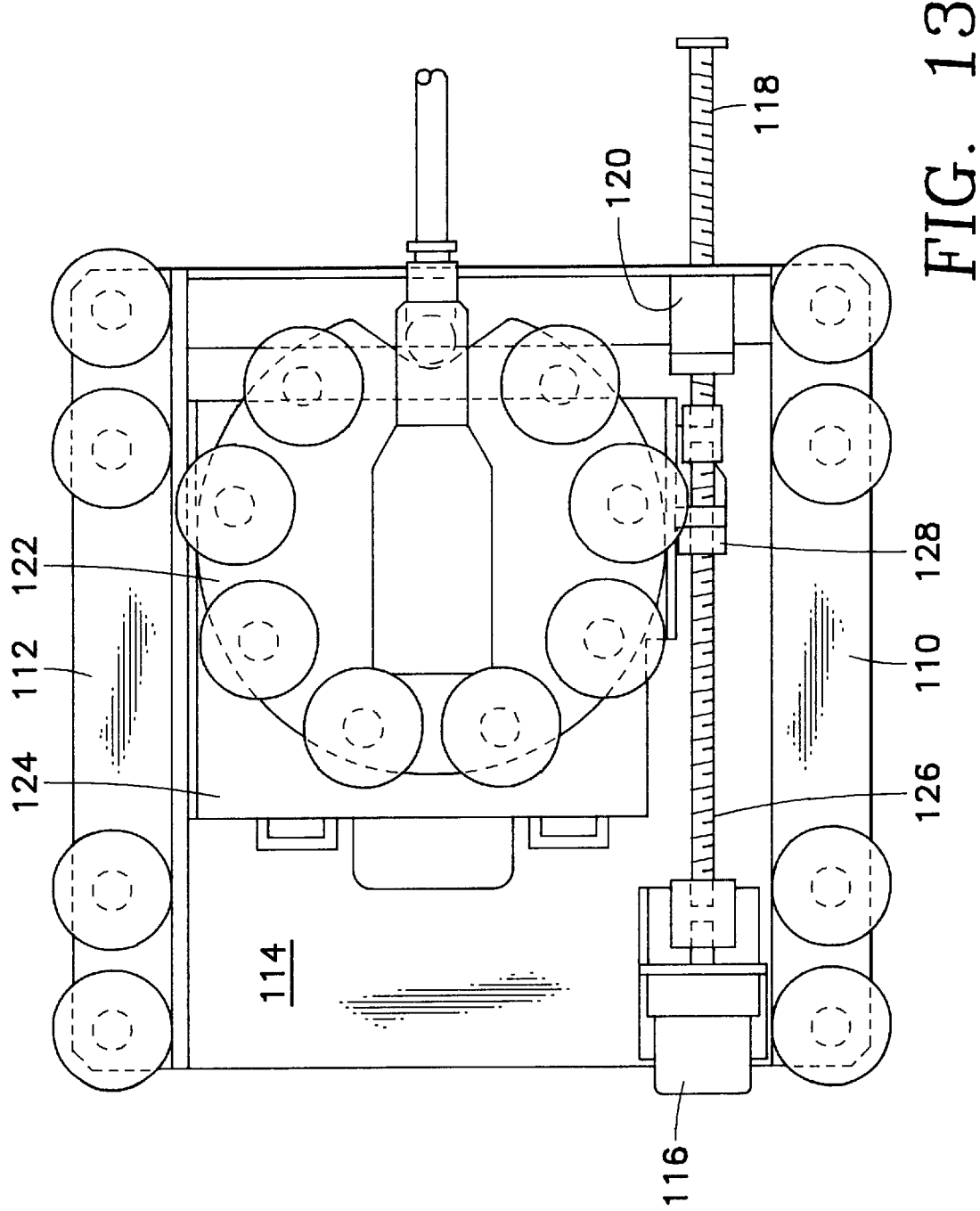
FIG. 13 is an alternative embodiment of the present invention.

FIG. 13 is an alternative embodiment of the present invention. Alternatively, a more compact crawler is disclosed with a second leg assembly 110 having a compact bracket 112 slidably coupled to a platform 114. The crawler also includes a motor 116. The second leg assembly has a second ball screw 118 and a second receiver 120 operated by the motor 116 and physically located on one side of the platform 114. The crawler further includes a first leg assembly 122 having a compact bracket 124 slidably coupled to the platform 114 and a first ball screw 126 and a first receiver 128 operated by the motor 116 and physically located opposite the second ball screw 118. The first ball screw 126 of the first leg assembly 122 has an opposite pitch from the second ball screw 118 (i.e., right versus left hand threads) and is attached to the second ball screw 118 so that the motor 116 drives both ball screws 118, 126.

Linear movement of the platform 114 of FIG. 13 via the leg assemblies 110, 124 is similar to the linear movement of the platform 12 of FIGS. 6–12 with the exception of using only one motor for linear motion. Specifically, the one motor 116 turns both the first ball screw 126 and the second ball screw 118. Thus, the crawler is more compact and has fewer motors.

Figures 14, 15:
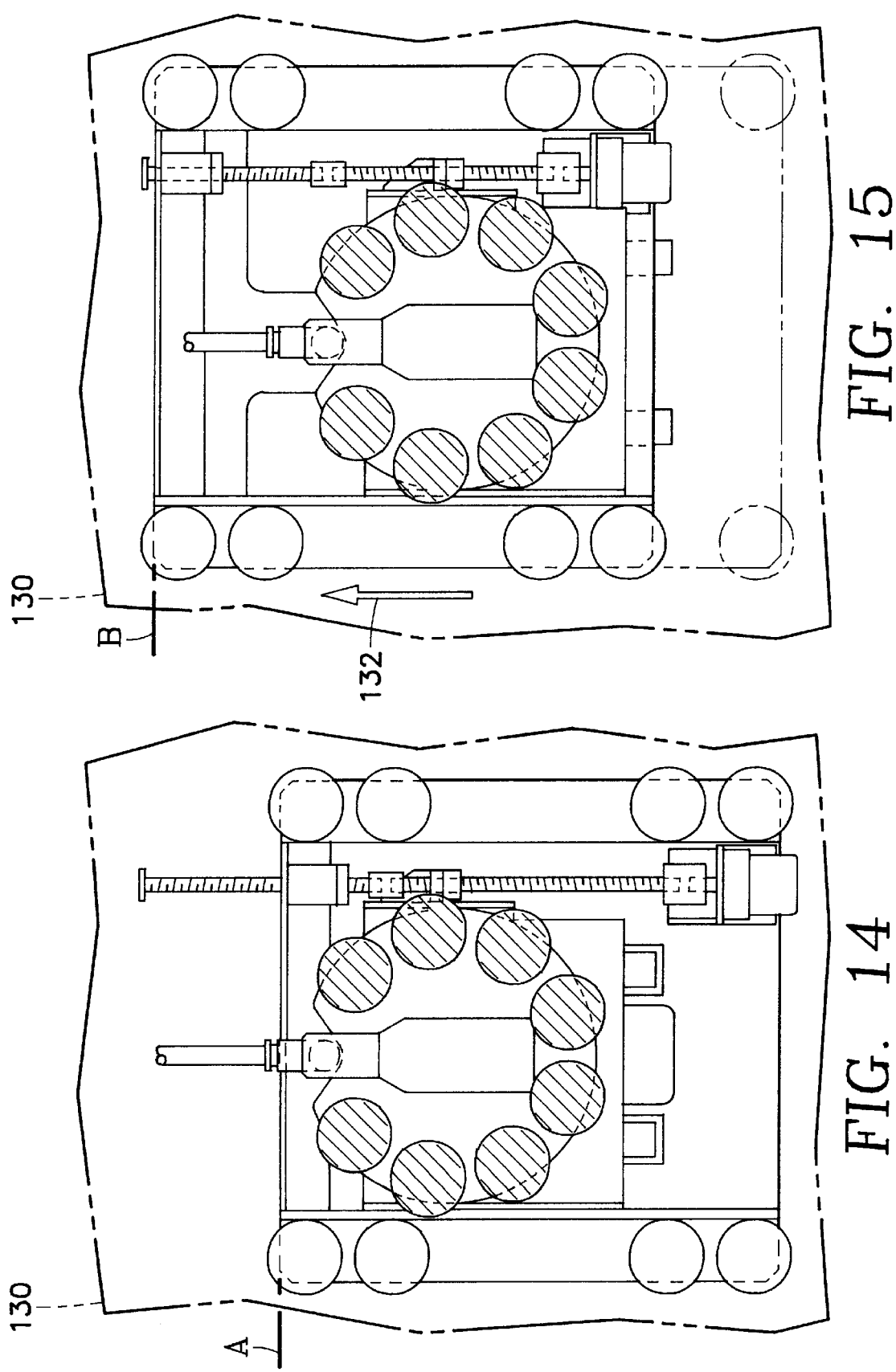
FIGS. 14–15 illustrate sequential movement of the automated crawling system of FIG. 13.

For instance, as shown in FIG. 14, the first leg assembly 14 is coupled (as indicated by shading of the first leg assembly 122 of FIG. 14) to an object 130 while the second leg assembly 110 remains uncoupled (as indicated by non-shading of the second leg assembly 110 of FIG. 14) to the object 130. Next, as shown in FIG. 15, linear movement of the crawler as indicated by arrow 132, is accomplished by operating the motor 116.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An automated crawling robot system for traversing about an object having a generally flat surface, comprising:
   a platform;
   a first leg assembly slidably coupled to the platform and rotatably coupled to the platform and having an intermittent coupling device for intermittently coupling the first leg assembly to the object;
   a second leg assembly slidably coupled to the platform and having an intermittent coupling device for intermittently coupling the second leg assembly to the object;
   means for slidably traversing the first and the second leg assemblies independent of each other and parallel to the flat surface; and
   means for rotatably traversing the first leg assembly such the the first leg assembly is capable of rotating the platform 360 degrees about a single point on the object with the first leg assembly coupled to the object.

2. The invention as set forth in claim 1, further comprising an onboard computer controller for controlling the movement of the robot.

3. The invention as set forth in claim 2, wherein the onboard computer controller controls the robot with preprogrammed instructions and with remote commands.

4. The invention as set forth in claim 1, further comprising a carrying area for carrying data gathering equipment and for transporting materials.

5. The invention as set forth in claim 1, wherein said platform further comprises a rail system, wherein said first and second leg assemblies slidably traverse independent of each other about said rail system.

6. The invention as set forth in claim 1, wherein said means for slidably traversing the first and second leg assemblies is a first motor with a ball screw and receiver system and a second motor with a ball screw and receiver system, respectively.

7. The invention as set forth in claim 1, wherein said means for rotatably traversing the first leg assembly is a rotary motor.

8. The invention as set forth in claim 7, wherein said rotary motor is a low mass compact ultrasonic motor.

9. The invention as set forth in claim 1, wherein said intermittent coupling device is a magnetic device having intermittently activated solenoids.

10. The invention as set forth in claim 1, wherein said intermittent coupling device is a plurality of suction cups.

11. The invention as set forth in claim 10, wherein said plurality of suction cups are a plurality of vacuum cups, each having a separate vacuum pump and a separate air cylinder coupled to it, wherein each vacuum pump provides each vacuum cup with a vacuum source independent of the other vacuum cups.

12. The invention as set forth in claim 11, wherein said vacuum pumps are venturi vacuum pumps.

13. The invention as set forth in claim 11, wherein said vacuum pumps and said air cylinders are coupled to a standard air compressor for providing each vacuum pump and each air cylinder with air pressures.

14. The invention as set forth in claim 13, wherein said air pressures range from 70–120 psi.

15. The invention as set forth in claim 13, further comprising flexible tubing for providing a means for transferring the air pressure from the air compressor to each vacuum pump and each air cylinder.

* * * * *